Nov. 15, 1966

G. CHANEY 3,285,261

BREATHING DEMAND REGULATOR

Filed Dec. 21, 1962

INVENTOR.
GERALD CHANEY

BY *Browne, Schuyler, & Beveridge*

ATTORNEYS.

Nov. 15, 1966  G. CHANEY  3,285,261
BREATHING DEMAND REGULATOR
Filed Dec. 21, 1962  2 Sheets-Sheet 2

INVENTOR.
GERALD CHANEY
BY
Browne, Schuyler, and Beveridge
ATTORNEYS.

United States Patent Office 3,285,261
Patented Nov. 15, 1966

3,285,261
BREATHING DEMAND REGULATOR
Gerald Chaney, Anaheim, Calif., assignor to Robertshaw Controls Company, a corporation of Delaware
Filed Dec. 21, 1962, Ser. No. 246,425
6 Claims. (Cl. 137—64)

This invention relates to a breathing demand regulator or use with an oxygen supply as may be used in hospitals, rescue units, etc., and more particularly to apparatus for regulating the flow of oxygen to the user either by normal respiration or by positive pressure.

This invention is particularly adapted for use in situations where there is no need to make adjustments for variations in atmospheric pressure. The corresponding reduction in parts and more advantageous location of components reduce both the complexity and expense of the regulator.

One object of the present invention is to provide a breathing demand regulator especially designed for ease and simplicity of manufacture while retaining the dual capabilities of positive pressure control and reliable demand breathing.

It is another object of this invention to provide a breathing demand regulator which utilizes the pressure of the gas coming into the regulator to control the flow of gas to the user.

It is another object of this invention to provide a breathing demand regulator having a direct passage between the gas inlet and the flow controlling means.

It is another object of this invention to provide a breathing demand regulator which provides a rapid shut off of the oxygen supply.

It is still another object to provide a breathing demand regulator which is compact in design and reliable in operation.

The invention is accomplished by a unique combination of parts which results in a regulating system which is simple of structure and compact of size. In its preferred embodiment, a pressure responsive valve is located in the regulator between the oxygen supply and the regulator outlet. Oxygen is bled through an orifice in the valve to a surge chamber where its back pressure, because of an area advantage, acts to maintain the valve in a normally closed position. When the back pressure in the chamber is reduced by opening a second valve, the pressure responsive valve will open, permitting passage of the oxygen to the user.

Because the orifice is located in the pressure responsive valve, it is possible to greatly reduce the complexity of the regulator by the elimination of circuitous passages which heretofore had to be provided within the body of the regulator.

The design of the back-up plate which is employed in this invention not only adds to the sealing features of the valve by virtue of the area advantage presented by it, but also because it facilitates a positive cut off, thereby preventing oscillation or flutter of the valve which would vary outlet pressure and hinder the breathing of the user.

Other objects and advantages of this invention will become apparent from the following description taken in connection with the accompanying drawings wherein.

Figure 1:
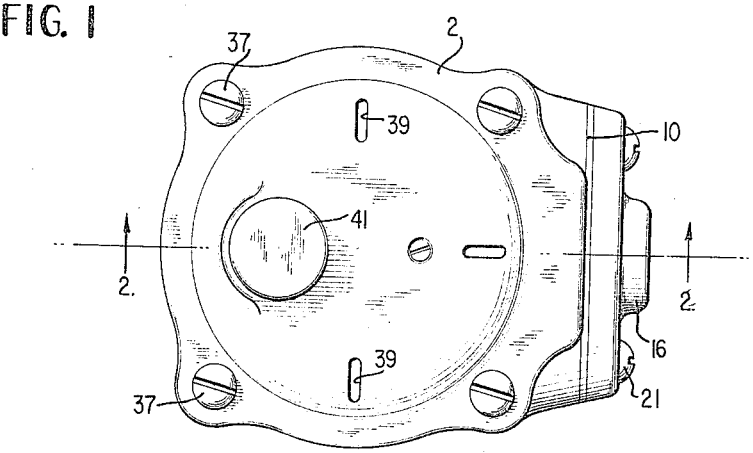
FIGURE 1 is a plan view of the regulator according to the invention.
Figure 2:
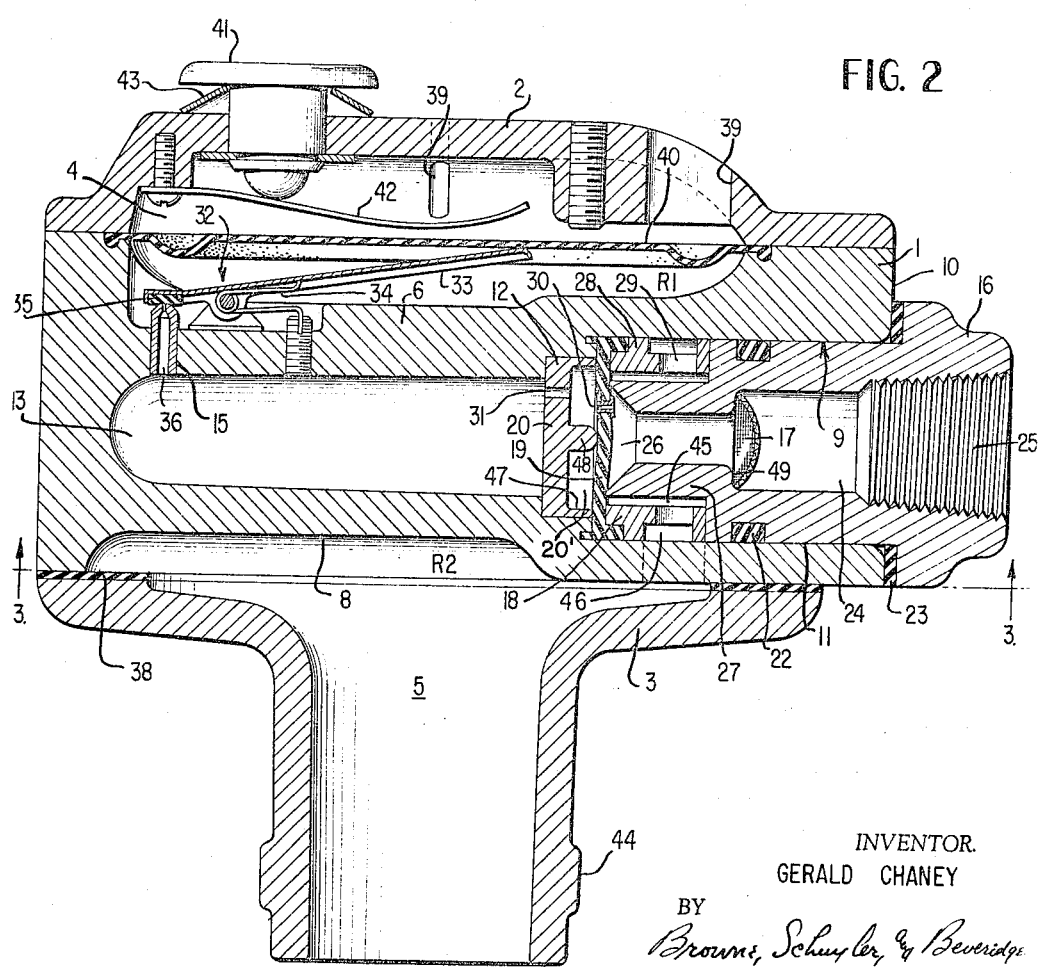
FIG. 2 is an enlarged section taken along lines 2—2 of FIG. 1.
Figure 3:
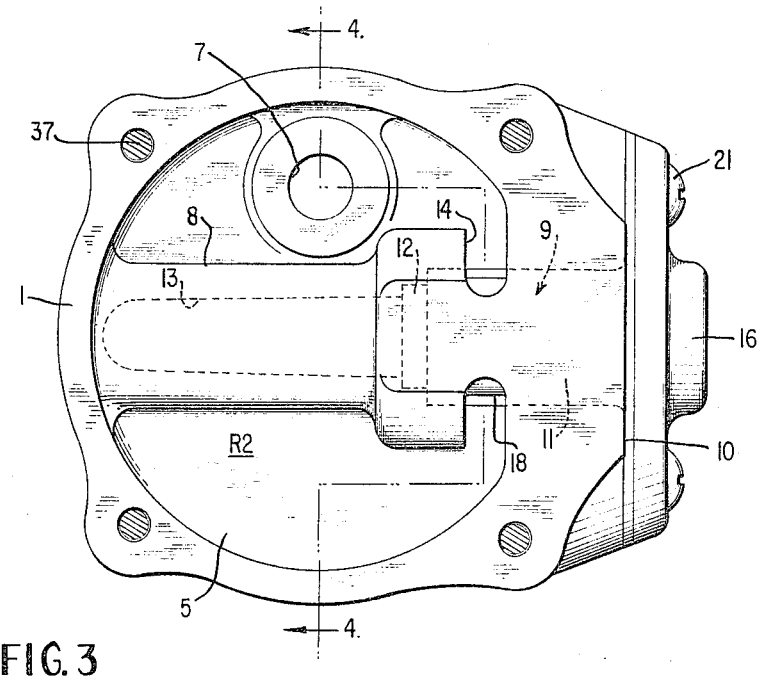
FIG. 3 is a bottom view of the regulator with the outlet housing removed.
Figure 4:
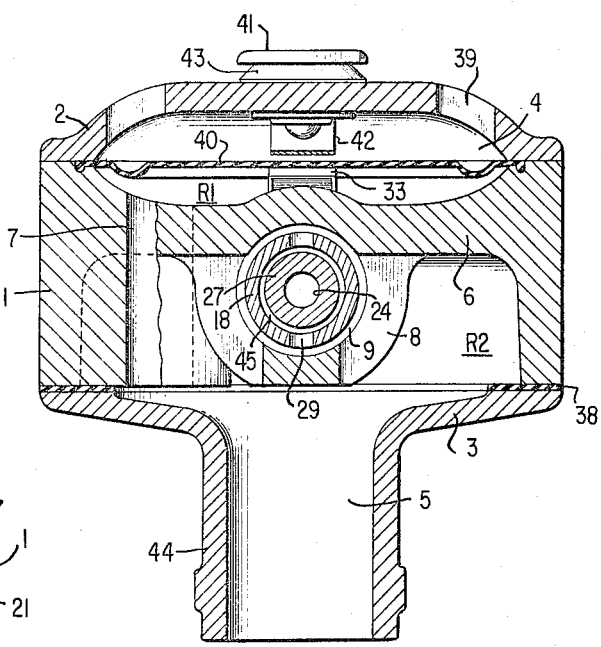
FIG. 4 is a front section taken along the lines 4—4 of FIG. 3.

The regulator consists of three principal parts: a body 1, cap 2 and an outlet housing 3. Body 1 is a single piece unit having a first or upper recess R1, which forms the lower portion of a sensing chamber 4 and a second or lower recess R2, which forms the upper portion of an outlet chamber 5, the recesses being separated by a central wall 6. An aperture 7 (FIG. 4) provides constant communication between recesses R1 and R2. Wall 6 is formed with a downwardly projecting enlargement defining a substantially cylindrical central member 8 which projects centrally into recess R2. A bore 9 extends from face 10 of body 1 into central member 8 and is formed with an enlarged outer or inlet section 11, a seat 12, and an inner section or surge chamber 13. Recesses 14 are formed on central member 8 to provide communication between inlet section 11 and recess R2 and a valve opening 15 is located to extend between the inner end of surge chamber 13 and recess R1.

An inlet fitting 16 is secured to face 10 of body 1 by screws 21 and is sealed within the bore by gaskets 22 and 23. Fitting 16 has a central passage 24 which includes an internally threaded section 25 for attachment to an oxygen source, inwardly extending shoulders 49 which act as a seat for a filter 17, and a flared chamber 26. The end of reduced diameter nose portion 27 of inlet fitting 16 seats against a pressure responsive valve 19. Nose portion 27 is surrounded by an orifice ring 18. Ring 18 is formed with peripheral ribs 28 which space it from inlet section 11. The internal diameter of ring 18 is slightly larger than the external diameter of nose portion 27 to provide a passage between the inlet section 11 and the outlet chamber 5 via orifices 29 in ring 18. This passage is normally closed by pressure responsive valve 19.

Back-up plate 20 fits into seat 12 and acts to maintain pressure responsive valve 19 in its normally closed position. The configuration of back-up plate 20 in cross-section is that of an "E." The outer legs press valve 19 against orifice ring 18 while the central leg bears against the central portion of valve 19. The exposed area of valve 19 facing plate 20 is larger than that facing flared chamber 26. The significance of this will be explained subsequently. Back-up plate 20 in its preferred form is a flat disc having a peripheral wall 47 which bears against the outer portion of pressure responsive valve 19, and a projection 48 extending along its central axis. Projection 48 extends slightly beyond wall 47 to urge valve 19 across the passage formed between nose 27 and ring 18.

When valve 19 is in its open position, it will be drawn back into operating chamber 20' defined by the spaces between the legs of back-up plate 20. The opposing force offered by the central leg minimizes this movement, thereby facilitating a rapid and positive closing action to prevent unwanted flutter or oscillation of the valve.

By using the "E" configuration for back-up plate 20, it is thus possible to effect a rapid closure of valve 19 without sacrificing the area advantage necessary to operation of the regulator. Restricted orifices 30 and 31 are provided in pressure responsive valve 19 and back-up plate 20 to permit a controlled flow of oxygen to surge chamber 13.

Figure 5:
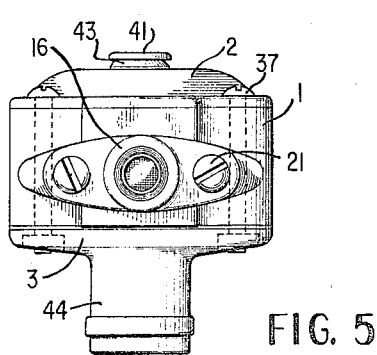
FIG. 5 is a front view of the regulator according to the invention.

A paddle valve assembly 32 is mounted in sensing chamber 4, and consists of a paddle 33, which is biased by a spring 34, a valve pad 35 and a restricted valve passage 36 which is seated in opening 15 between surge chamber 13 and sensing chamber 4. Cap 2 and outlet housing 3 are secured to body 1 by means of bolts 37 (FIG. 5). A gasket 38 between body 1 and outlet housing 3 provides an air tight seal.

Cap 2 has openings 39 to present atmospheric pressure to a diaphragm 40. Diaphragm 40 separates the upper and lower portions of sensing chamber 4 and bears against paddle 33. A push button 41 bears against an actuating spring 42 and is maintained in its inoperative condition by a restoring spring 43.

In operation, a reduced pressure oxygen source is attached to the regulator by means of threaded section 25 of inlet fitting 16. Suitable breathing apparatus is attached to neck 44 of outlet housing 3.

The flow of oxygen from the source will be through filter 17 to pressure responsive velve 19 and through control orifices 30 and 31 of valve 19 and back-up plate 20 into surge chamber 13. At this point there is no negative pressure on diaphragm 40 and paddle valve 32 will be closed, trapping the oxygen in surge chamber 13.

Because the area of pressure responsive valve 19 which is exposed to the recess formed by back-up plate 20 is larger than that area exposed to flared chamber 26, the total force of the back pressure against valve 19 will be greater than that of the inlet pressure, and the valve will remain closed.

When the user inhales, the pressure in outlet chamber 5 will decrease and, because of aperture 7 in wall 6 there will be a corresponding decrease of pressure in lower portion R1 of sensing chamber 4. The differential between upper and lower sections of sensing chamber 4 will cause diaphragm 40 to move downward, pressing against paddle 33 and raising valve pad 35 to permit escape of the oxygen from surge chamber 13. Reduction of pressure in surge chamber 13 will eliminate the back pressure area advantage on valve 19 and it will be moved towards back-up plate 20 to permit passage of the oxygen through flared chamber 26 to a space 45 between nose 27 and orifice ring 18 and from there through orifices 29 to outlet chamber 5, via a space 46 formed by peripheral ribs 28.

Upon exhalation, the negative pressure on diaphragm 40 decreases and it restores to its normal position. This releases paddle 33 closing valve passage 36 to surge chamber 13. As pressure again builds up in surge chamber 13, the area advantage on the interior side of valve 19 will be regained, and it will close, cutting off the supply to outlet chamber 5.

When manual control of the oxygen flow is desired, paddle valve assembly 32 is operated by depressing button 41. This forces actuating spring 42 against paddle 33 to open valve passage 36 and the operation takes place as previously described. When button 41 is released, it will be restored by spring 43 and the oxygen flow will be interrupted.

By restricting the flow of gas from operating chamber 20' to surge chamber 13 through orifice 31, the rate at which the pressure drops in chamber 20' will be lower than the rate of pressure drop in surge chamber 13. Conversely, a build-up of pressure in operating chamber 20' will be at a lower rate than the build-up in surge chamber 13 when valve passage 36 is closed. This differential introduces a delay or damping factor in the response of valve 19 to the operation of valve 32 which is effective to prevent chattering of valve 19 by short term shifts of diaphragm 40. The effect of such shifts is further minimized by restricting the flow of gas through passages 36.

While I have described and illustrated a preferred embodiment of my invention, I wish it to be understood that I do not intend to be restricted solely thereto, but that I do intend to cover all modifications which would be apparent to one skilled in the art, and which come within the spirit and scope of my invention.

What is claimed is:

1. A breathing demand apparatus comprising a housing having an inlet passage and an outlet passage; normally closed pressure responsive valve means operable when open to place said inlet in communication with said outlet, said valve means including a movable sealing member extending across said inlet and a backup plate spaced from said sealing member; a surge chamber in said housing separated from said inlet by said pressure responsive valve means; restricted orifices in said member and said backup plate for passage of gas from said inlet to said surge chamber, said backup plate having a generally centrally located projection engageable with said sealing member and urging said sealing member towards a position closing said passage, said valve means being responsive to the pressure differential between said inlet and said surge chamber to open when the pressure in said inlet exceeds the pressure in said surge chamber; and means responsive to a reduction in pressure at said outlet for reducing the pressure in said surge chamber to open said valve means and connect said inlet and outlet.

2. Breathing demand apparatus according to claim 1 wherein said means for reducing the pressure in said surge chamber comprises second normally closed valve means operable upon the reduction of pressure in said outlet below a predetermined pressure to place said surge chamber in direct communication with said outlet.

3. A breathing demand regulator comprising a housing; a bore extending into said housing; a flexible valve member extending across said bore to divide said bore into an inner chamber section and an outer inlet section; a cylindrical fitting seated in said inlet section, said fitting having a reduced diameter nose portion engageable by said valve member; a central first passage in said fitting, said first passage flaring outwardly at the inner end to define a valve seat cooperable with said valve member to define a valve assembly; a back-up plate disposed in said chamber section spaced from said valve member to further divide said chamber section into an operating chamber and an inner surge chamber, said back-up plate having projections extending against said valve member and urging said valve member against said seat to define a normally closed condition of said valve assembly; an outlet section in communication with said inlet section and normally isolated from said first passage by said valve assembly; a normally closed second passage between said outlet section and said surge chamber; an orifice in said valve member and said back-up plate to provide constant communication between said first passage and said chamber section whereby the pressure in said chamber section will normally be the same as that in said first passage when said second passage is closed; and means for opening said second passage to create a pressure differential between said first passage and said operating chamber via said surge chamber, said orifice in said back-up plate restricting the rate of flow from said operating chamber to said surge chamber in response to said pressure differential and in delayed response to the opening of said second passage to shift to an open condition and connect said first passage to said outlet.

4. A breathing demand apparatus comprising a housing having an inlet and outlet;

a normally closed pressure responsive flexible valve member isolating said outlet from said inlet;

a back-up plate spaced from said member and separated from said inlet by said member;

said back-up plate having leg portions engaging and urging said member in its nomally closed position;

means defining a surge chamber located on a line with said inlet and separated from said inlet by said member and said back-up plate;

restricted orifices in said member and said back-up plate for passage of gas from said inlet to said surge chamber;

the effective fluid pressure areas of said member being such that the total force of the pressure normally exerted on the surge chamber side of said member is greater than the force exerted on said member by the inlet pressure;

means defining a sensing chamber;

and means associated with said sensing chamber adapted to place said surge chamber and said sensing chamber in communication for reducing the pressure in said surge chamber to obtain a pressure differential on said member sufficient to open said member thereby connecting said inlet and said outlet.

5. A breathing demand regulator according to claim 4 wherein said back-up plate consists of a disc having a peripheral wall engaging the outer portion of said member, and a centrally located projection extending beyond said wall and in contact with said member, the space between said wall and said projection forming a recess to permit movement of said member, and defining an operating chamber for said member.

6. A breathing demand regulator comprising a housing having an outlet section and an elongate bore extending into said housing;
 a flexible valve member extending across said bore to divide said bore into an inner chamber section and an outlet inlet section;
 said valve member normally isolating said inlet section from said outlet section;
 a back-up plate spaced from said valve member and dividing said chamber section into an operating chamber positioned between said plate and said member and a surge chamber, said back-up plate having a generally centrally located projection engageable with said sealing member and urging said sealing member towards a position closing said passage;
 a normally closed passage between said surge chamber and said outlet section;
 restricted orifices respectively in said valve member and in said back-up plate to provide constant communication between said inlet section and said chamber section whereby the pressure in said chamber section will normally be the same as that in said inlet section when said passage is closed;
 and means for opening said passage to create a pressure differential between said inlet section and said operating chamber via said surge chamber;
 the effective fluid pressure areas of said valve member being such that the total force of the pressure normally exerted on the surge chamber side of said valve member is greater than the force exerted on the valve member by the inlet pressure;
 said orifice in said back-up plate restricting the rate of flow from said operating chamber to said surge chamber;
 said valve member operating in response to said pressure differential and in delayed response to the opening of said passage to connect said inlet section and said outlet section.

References Cited by the Examiner
UNITED STATES PATENTS

| | | | |
|---|---|---|---|
| 2,384,669 | 9/1945 | Fields | 137—64 |
| 2,597,039 | 5/1952 | Seeler | 137—64 X |
| 2,764,151 | 9/1939 | Cupp | 128—142 |
| 2,914,293 | 11/1959 | Harrell | 251—36 |
| 2,988,085 | 6/1961 | Jones | 128—142 |

FOREIGN PATENTS

| | | |
|---|---|---|
| 1,222,151 | 1/1960 | Great Britain. |
| 681,514 | 9/1939 | Germany. |
| 1,037,379 | 8/1958 | Germany. |
| 885,353 | 12/1961 | Great Britain. |

WILLIAM F. O'DEA, *Primary Examiner.*

M. CARY NELSON, *Examiner.*

J. DEATON, R. GERARD, *Assistant Examiners.*